United States Patent [19]
Turner et al.

[11] 3,926,050
[45] Dec. 16, 1975

[54] METHOD AND APPARATUS FOR DETERMINING SOLIDS DELIVERED FROM MOVING SLURRY

[75] Inventors: Thomas M. Turner, Severna Park; Charles H. Scheid, Baltimore, both of Md.

[73] Assignee: Ellicott Machine Corporation, Baltimore, Md.

[22] Filed: Aug. 28, 1974

[21] Appl. No.: 501,297

Related U.S. Application Data

[63] Continuation-in-part of Ser. No. 367,865, June 7, 1973, abandoned, and Ser. No. 299,134, Oct. 19, 1972, abandoned, which is a continuation-in-part of Ser. No. 218,760, Jan. 18, 1972, abandoned.

[52] U.S. Cl.............................. 73/205 D; 73/438
[51] Int. Cl.²....................... G01N 9/26; G01F 1/88
[58] Field of Search..... 73/28, 61 R, 194 M, 205 D, 73/211, 214, 438

[56] References Cited
UNITED STATES PATENTS

| | | | |
|---|---|---|---|
| 1,104,433 | 7/1914 | Mapelsden | 73/205 D |
| 1,181,490 | 5/1916 | Levin | 73/214 |
| 1,697,867 | 1/1929 | Haultain | 73/438 |
| 2,294,455 | 9/1942 | Haultain | 73/438 |
| 2,728,218 | 12/1955 | Ramser | 73/28 |
| 2,746,292 | 5/1956 | Vetter | 73/205 D |
| 2,768,528 | 10/1956 | Hagler | 73/438 |
| 3,033,036 | 5/1962 | Leisey | 73/194 M |
| 3,554,011 | 1/1971 | Van Der Veen | 73/61 R |

FOREIGN PATENTS OR APPLICATIONS

| | | | |
|---|---|---|---|
| 1,083,782 | 6/1954 | France | 73/438 |

*Primary Examiner*—Richard C. Queisser
*Assistant Examiner*—John P. Beauchamp
*Attorney, Agent, or Firm*—Scrivener Parker Scrivener and Clarke

[57] ABSTRACT

Method and apparatus for determining the quantity of solids in a slurry of solids and liquid flowing in a pipeline by the multiplication product of the specific gravity and velocity of the slurry. Specific gravity is determined as the function of the pressure differential between taps in the logs of a U-bend and velocity is determined as the pressure differential between horizontal taps in an elbow of the U-bend. In addition to multiplying means for deriving solids flow rate, the invention includes integrating means for determining total solids flow and means for separately visually displaying specific gravity, velocity, rate of solids flow and total flow of solids.

18 Claims, 7 Drawing Figures

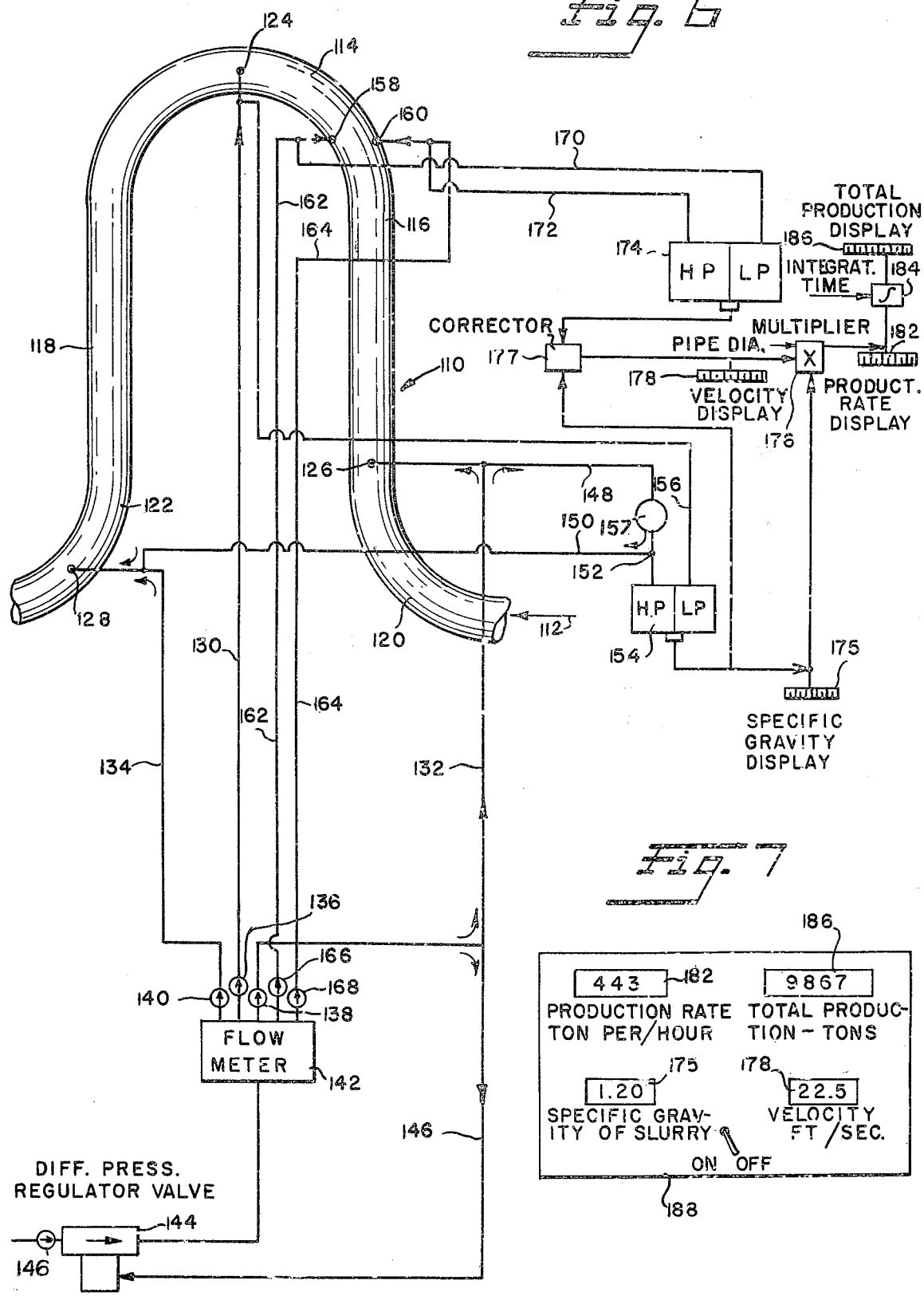
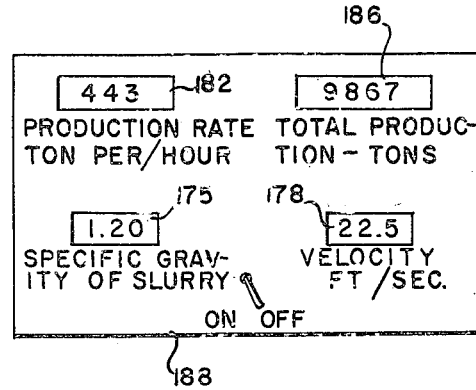

METHOD AND APPARATUS FOR DETERMINING SOLIDS DELIVERED FROM MOVING SLURRY

This is a continuation-in-part of application Ser. No. 299,134, filed Oct. 19, 1972, now abandoned, and a continuation-in-part of application Ser. No. 367,865 filed June 7, 1973, now abandoned; Ser. No. 299,134 being a continuation-in-part of Ser. No. 218,760 filed Jan. 18, 1972, now abandoned.

This invention relates to a method and apparatus for automatically determining and displaying data related to solids in a solid-liquid slurry flowing in a pipeline.

Though the present invention is not restricted to use in dredging operations it will be described in connection with such use because of its particular utility in this field.

Heretofore, a dredge operator has had to rely almost exclusively on a single instrument, namely a vacuum gauge, for positioning the cutter head for maximum dredging efficiency, i.e., the pumping of maximum solids per hour. It has been known, however, that much greater efficiency could be achieved if the operator were able to adjust the cutting head not only relative to vacuum but also relative to the specific gravity of the dredge spoil.

A means for determining specific gravity of slurry flowing in pipes is disclosed in the patent to Hagler U.S. Pat. No. 2,768,529, owned by the same assignee as the present application. In the patented system the slurry is caused to traverse the vertical legs in a U-shaped bend in the discharge pipe, each leg having a pair of vertically spaced presssure taps therein with the taps in one leg being in the same horizontal plane as the corresponding taps in the other leg. A differential pressure sensitive device is connected across the vertical taps in each leg and specific gravity is determined as a function of the sum of the pressure differences in both legs; that is to say, with a pipe of uniform diameter and with equal spacing between corresponding taps in each leg, specific gravity is determined as the sum of the pressure differences between the respective pairs of taps divided by the product of the combined distance between each pair of taps and $62.5 \neq \models/\text{ft}^3$. Because these latter two functions are fixed and known, there is little difficulty in providing calibrated means for establishing specific gravity as a function of the sum of the pressure differences in the two legs.

A known extension of the above described principal involves again the use of two taps in vertical legs with the corresponding taps in each leg being in the same horizontal plane. However, instead of the two taps in each leg being connected vertically together across respective differential pressure sensitive devices, a pair of horizontal conduits connect the corresponding taps in each leg and the midpoints of the respective conduits are connected across a single differential pressure sensitive device whose output may be connected to an indicator calibrated for values of specific gravity. Such an arrangement is described in the patent to Van Der Veen Re. No. 27,526.

In the patent to Van Der Veen Re-issue No. 27,535 the Hagler system is shown and described and a known velocity meter is added to the system. The pressure differences in the two legs of the U-bend are added together by a known summing element and this sum is multiplied by the velocity by means of a known multiplying element, these elements being part of a calculating machine which also contains a known integrating element for integrating the product from the multiplier over the total flow time. The final result is said to represent the quantity of solids deposited at the outlet of the conduit.

It has been discovered through carefully controlled experiments involving the use of a full scale dredge test fixture, that the above described systems for determining specific gravity are not accurate and that reliance upon them without consideration of other factors does not actually produce the optimum efficiency and one object of the present invention is to provide an improved arrangement which overcomes the inaccuracies in the prior art specific gravity measuring systems.

More specifically it is an object of the invention to provide a specific gravity measuring system for slurries moving in a pipe line, the system comprising pressure taps associated with the legs of a U-bend forming a part of the pipe line and wherein the taps in each leg are disposed in predetermined radial and/or linear positions relative to the leg such that the pressure difference between the taps associated with each leg is equal in both legs for clear water flowing in the pipe line and is also equal when slurry flows through the pipe line. Instead of two separate taps in the direction of the bend, a single tap may be utilized, preferably positioned in the plane of the center of the bend.

Another object of the invention is to provide a method and apparatus which not only derives an accurate determination of specific gravity, but also provides a display of the total quantity of solid deposited from the flow line while also continuously displaying the specific gravity of the slurry, its velocity in the flow line, and the production rate, i.e. tons per hour of the solids. With this information on constant display, the dredge operator may utilize it in combination with other data such as his vaccuum guage reading so as to operate the dredging equipment at its maximum efficiency.

The invention will now be described in connection with the accompanying drawings wherein:

FIG. 1 schematically illustrates the improved arrangement for determining specific gravity of dredging spoil in accordance with the invention;

FIG. 6 is a schematic view of a system embodying the features of the present invention; and FIG. 7 is a more or less diagramatic view of a display console which may be utilized with the present invention.

Figure 1:
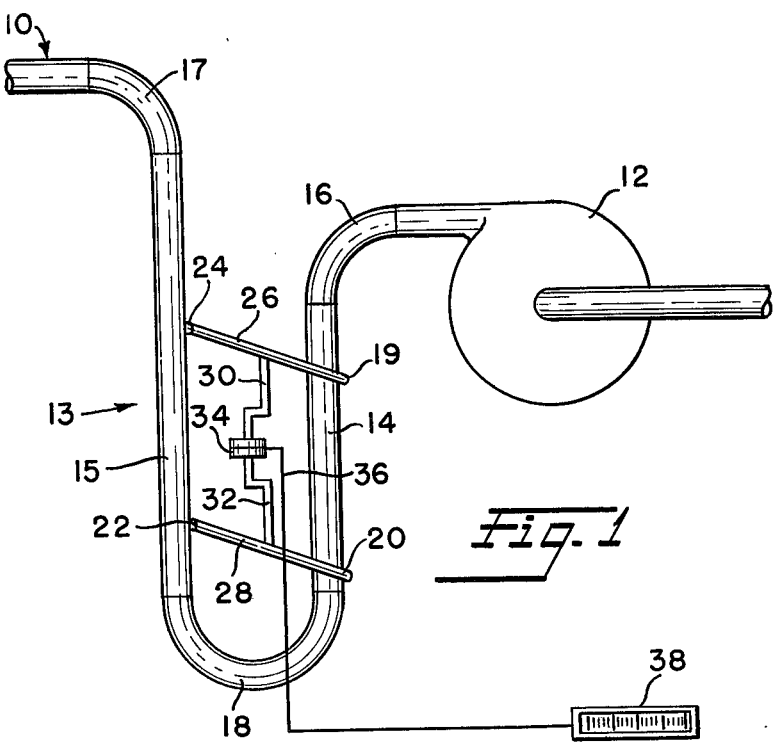

Referring now to FIG. 1, the numeral 10 illustrates a pipe for slurry such as dredge spoil which is delivered to the pipe by way of a centrifugal pump 12. The pipe 10 includes a U-shaped section 13 which may be as illustrated or inverted to provide a pair of vertical legs 14, 15, the upper ends of which are connected to horizontal portions of the pipe by 90° elbows 16, 17 respectively, and the lower ends of which are connected together by an 180° U-bend 18 or equivalent arrangement, such as a pair of interconnected elbows. Though preferably the U-shaped section is vertical, if space limitations require it the section could lie in a plane angularly related to the horizontal provided, however, that the legs have vertical dimensions.

Provided in each leg 14, 15 is a pair of vertically spaced taps 19, 20 and 22, 24 respectively. Interconnecting the corresponding upper and lower taps of each pair are cross conduits 26, 28 whose midpoints are connected by pressure sensing conduits 30, 32 to the opposite sides of a single differential pressure sensitive device 34 having an output 36 connected to an indicator 38 calibrated to give direct readings of specific gravity.

Though the vertical spacing between each pair of taps in FIG. 1 is the same, it will be observed that the corresponding taps do not lie in horizontal planes, though they do lie in sloping planes which are parallel to each other. In accordance with the invention, it has been discovered after extensive research that unless the pressure taps in the legs are located in positions where fluid flow is uniform and substantially free of turbulence caused by the sudden change in direction as the fluid traverses the elbows 16, 17, 18 the pressures at the taps are not an accurate reflection of the composition of the slurry flowing in the pipe. For example, if the tap 19 is too close to the first elbow 16, as the slurry enters the elbow the heavier constituents due to inertia tend to travel in a straight line toward the left or the outside of the elbow and thus give an indication of pressure at the tap which is greater than the actual mean pressure of the fluid at that point. Likewise, as the fluid approaches the lower elbow there is back turbulence which extends in a counter direction to fluid flow in the leg 14 and if the tap is disposed in this region the pressure at the tap is not an accurate reflection of fluid constituency. Preferably each tap should be on the side of the pipe which is inside the turn of an elbow so as to be as free as possible of residual imbalance of solids in the flow caused by inertia or centrifugal force as the flow traverses an elbow. Thus the taps 19, 20 are shown disposed in leg 14 on the side thereof which is inner most relative to the upstream elbow 16. The taps 22, 24 in leg 15 are likewise on the inner side of the turn of U-bend 18.

The upper and lower taps of each pair should be located as far apart as practicable with each being disposed in a region in the leg which is just beyond or just short of the serious elbow-effects on the fluid flow. Because the back turbulence extends only a relatively short distance up into the pipe leg 14, the lower tap 20 can be relatively close to the elbow whereas the upper tap 19, because of the relatively much greater extent of the forward turbulence, must be located a greater distance from the elbow 16 in order that it will be exposed to uniform flow free of turbulence.

In like manner the lower tap 22 in the leg 15 of the pipe must be positioned at a point which is spaced substantially above the U-bend 18. The upper tap 24 in the leg 15 which may be substantially longer than the leg 14 as shown may be positioned above the lower tap 22 the same distance as the tap 19 is positioned above the tap 20 in leg 14.

With the described arrangement wherein the taps are positioned, not necessarily in horizontal planes as thought essential by the prior art, but in positions spaced as far apart as practicable while still being positioned in regions of relative non-turbulence and uniform flow, the indication of specific gravity is far more accurate than in the prior art arrangements which failed to recognize the problems resulting from turbulence and uneven distribution of spoil caused by the elbows.

Figure 2:
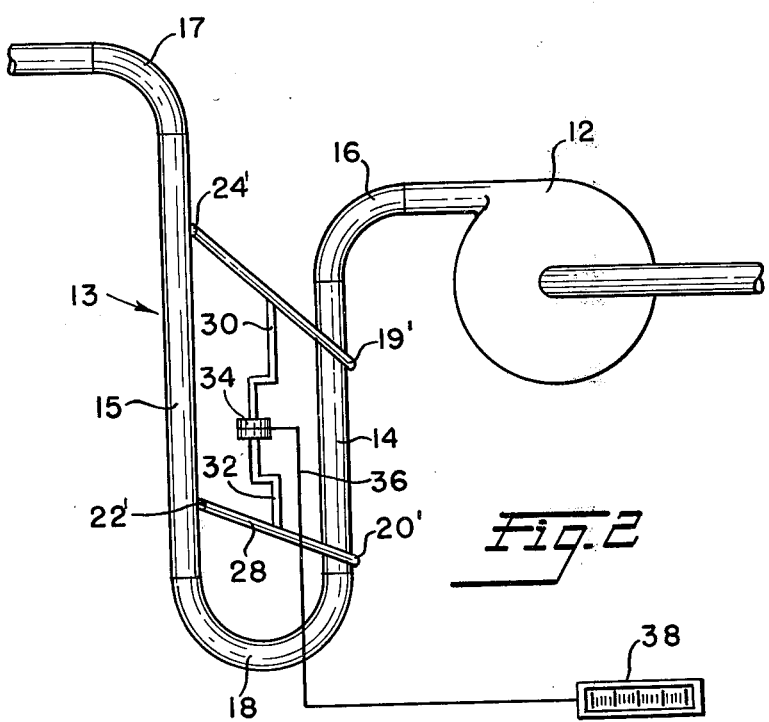
FIG. 2 illustrates modification of the arrangement of FIG. 1.

The arrangement of FIG. 2 is similar to that of FIG. 1 and like reference characters apply to like parts. FIG. 2 differs from FIG. 1 in that it illustrates an arrangement wherein even greater accuracy can be obtained over the arrangement of FIG. 1 by positioning the taps of each leg not necessarily the same distance apart but rather a distance which takes into account accumulated downstream disturbances. By spacing the taps an equal distance apart in FIG. 1, the friction losses between the taps of each pair are theoretically cancelled out, but this does not take into account that in the course of the 180° U-bend, the cross-sectional velocity distribution distorts into a high velocity stream, surrounded by a slower moving and varying-shape annulus. Since the basic principle of conservation of mass applies, the average velocity across the constant cross section of the discharge pipe must be equal at all points. However, integration of the velocity head (which varies as velocity squared) across a section of the pipe containing a high velocity stream yields a higher total velocity head than if the velocity were uniform in the pipe. Thus the flow following the 180° U-bend in leg 15 has a higher velocity head than does the flow following only a 90° bend in leg 14. Some of this extra velocity head is converted into static pressure head in leg 15 between taps 22' and 24' resulting in an apparent friction loss.

The inherent error due to the described flow pattern can be substantially eliminated by placing the upper tap 24' in the leg 15 in a position which bears no special relationship to the lower tap 22' but rather produces a pressure indication which is an accurate reflection of the combined frictional losses between the upper tap 19 in the right hand leg 14 and the upper tap 24' in the left hand leg 15 so that frictional losses do in fact cancel out and do not produce an error in the specific gravity reading.

The positioning of the taps in either FIG. 1 or FIG. 2 must, of course, be somewhat empirical and it has been found that if the upper tap is spaced about 3 pipe diameters below the end of the elbow, it will establish a practicable measurement point. In like manner, it has been determined that where a tap adjacent an elbow producing counter or back turbulence is spaced about 1.5 pipe diameters above or below that elbow, it will establish a practicable measurement point. The upper tap 24 is then placed a greater distance above the position of the lower tap 22 to counter the flow pattern effect so as to provide the correct, adjusted reading. The ascending leg 15 should be sufficiently long so that its upper tap is not positioned in a region of counter turbulence caused by the downstream elbow 17.

Figure 3:
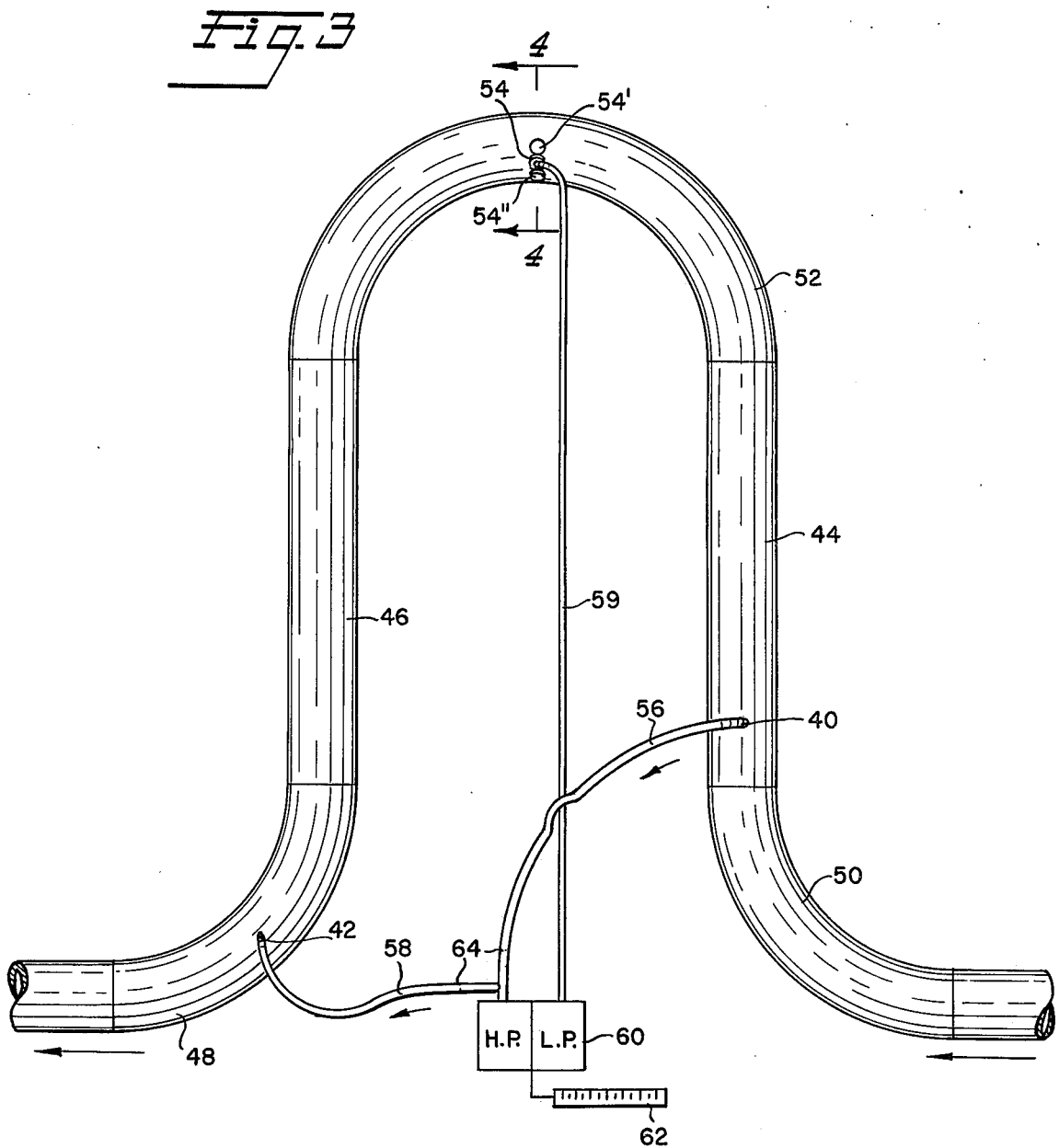
FIG. 3 illustrates a further modification.
Figure 4:
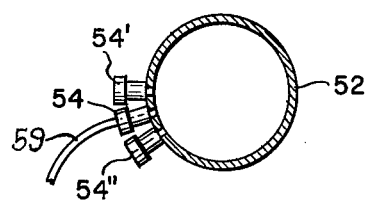
FIG. 4 is an enlarged section taken substantially on the line 4—4 of FIG. 3.

In the embodiment of FIG. 3 taps 40, 42 are provided in the respective legs 44, 46 of the U-bend in the direction of the elbows 48, 50 thereof, but instead of two taps in the direction of the bend 52 as in the embodiments of FIGS. 1 and 2, a single tap 54 is employed disposed preferably in a plane through the highest point of the bend which, for the symmetrical arrangement of FIG. 3, is a vertical plane through the center of the bend. The tap 54 shown is one of a plurality of radial taps represented by the numbers 54' and 54''. The tap 54 cooperates with both of the taps 40, 42 with pressure differences between the taps 40 and 54 being equalized with the pressure difference between taps 42 and 54 in a manner to be described.

As in FIGS. 1 and 2, the lower taps 40, 42 of FIG. 3 are connected together by averaging conduits 56, 58 leading to the high pressure side of a differential pressure sensing device 60 and the single tap 54 is connected by a conduit 59 to the low pressure side of the device. The device 60 is a known unit which produces an output signal representative of the pressure difference between the upper tap and the lower taps, which difference is a function of the specific gravity of the fluid traversing the U-bend. Thus the output signal from the device 60 may be fed to a meter 62 graduated to give direct readings of specific gravity.

Figure 5:
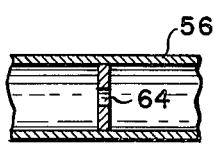
FIG. 5 is an enlarged broken cross-section showing a typical orifice employed in conduits of FIG. 3.

As mentioned above, it is customary in utilizing pressure taps extending through the walls of pipe lines carrying a moving sluury to determine the pressure in the pipe line as a resultant of the pressure in the line and purge water fed to the taps from a source (not shown) at a known greater pressure than that in the pipe line. The purge water flows through the tap 40 into the pipe line and also flows through the conduits 56, 58 in the direction of the arrows and thence into the pipe line through the tap 42. In order to limit the quantity of clear purge water required, the conduits 56, 58 are provided on opposite sides of their connection with the device 60 with orifices 64 more particularly shown in FIG. 5.

In accordance with the invention, accuracy of the specific gravity reading can be made to approach the actual specific gravity of the fluid in the pipe line with no or an acceptable slight margin of error by the careful selection of the positions of the taps 40, 42, 54 such that the pressure differences due to friction and elbow effects between the taps 42 and 54 and the taps 40 and 54 are equal when both clear water is flowing through the pipe line and when slurry is flowing through the pipe line.

For the first measurement with clear water, the tap 42 is located preferably in a plane through the center of the elbow 48, that is to say, 45° from the horizontal, and on the side of the pipe line in a position which averages the minimum pressure at the inner radius of the elbow with the maximum pressure due to centrifugal force of the fluid at the outer radius of the elbow. This position has been determined experimentally as being optimum for the downstream elbow. Initially, a tap 54' midway between the inner and outer radii of the bend 52 is selected and with the clear water flowing through the pipe line, the pressure difference between the taps 42 and 54' is determined in a known manner by the use of a suitable instrument, such as a manometer. Thereafter, the tap 40 in the right hand leg 44 of the U-bend is located on the side of the pipe in a position such that with clear water in the pipe line, the pressure difference between the taps 40 and 54 is equal or substantially eaqual to the previously determined pressure difference between the taps 42, 54'.

Having established the initial position of the tap 40, slurry of known specific gravity is then pumped through the pipe line, and the difference in pressure due to the weight of the solids in the legs of different lengths between the taps 42, 54' and 40, 54' is calculated. The actual pressure differences between the taps is then measured and the pressure differences due to the weight of the solids is subtracted from the measured values so that only the pressure differences due to factors such as friction and elbow effects remain. Hereinafter in the specification and claims where the pressures in the respective legs are said to be equalized for slurry flowing in the pipe line this means that the factor of slurry weight difference has been eliminated in the determination of the equalized pressure differences. Thus the pressure difference between the taps 42, 54' and the taps 40, 54' with slurry flowing in the pipe line but with weight factor removed is measured and it will be found, as expected, that the pressure differences due to the friction and elbow effects of the solids in the slurry are not equal. This difference can be equalized by repositioning the tap 40. When clear water is again pumped through the pipe line, the pressure differences may again be out of balance, but may be brought into balance by changing the radial position of the tap 54' to, say, the position of tap 54'', which is a region of lower pressure since it is closer to the inner radius of the bend than is the tap 54'.

When slurry is again pumped through the pipe line, the pressure differences may again be unequal, but the inequality will be less and either the radial position of the tap 54'' or the vertical position of the tap 40 or a combination of both may be resorted to to equalize the pressure differences. This procedure is repeated until a radial position of the tap in the bend, say, at 54, and a vertical position of the tap 40 is found which gives equal pressure difference between the taps 42, 54 and the taps 40, 54 for clear water and also for slurry. Having established these positions for the taps, they are then interconnected by the conduits and the differential pressure sensing device 60 with the output of the latter providing a signal proportionate to the specific gravity of a slurry of any consistency which might be pumped through the pipe line.

As a practical example of the relative position of the taps in a pipe line of normal diameter with the elbows and bend having a mean radius of three pipe diameters and the vertical legs having a length of six diameters, optimum results have been achieved with the tap 42 being located midway on the side of the elbow 48 as previously described, the tap 40 located on the side of the pipe line one pipe diameter above the elbow 50 and the tap 54 disposed in the center plane of the bend 52, but depressed radially 17° below horizontal.

Though the positioning of the taps has been described with particularity, it should be understood that the invention is not limited to this particular arrangement since obviously the upper tap 54 might be moved in one direction or the other away from the center plane of the bend and the taps 42 and 40 might be located in different radial, as well as in different linear positions. In short, the positioning of the taps can vary over a wide range so long as they achieve the objective of obtaining equal pressure differences between the upper tap and the two lower taps for clear water and for slurry.

The location of the tap positions of FIGS. 1 and 2 may be determined as described above in connection with FIG. 3. Referring to FIG. 2, for example, the taps may be first initially positioned to give equal pressure differences between each pair of taps in the respective legs with clear water. When slurry is caused to flow through a pipe line, the relative position of the taps of one leg can be varied to equalize pressure differences in both legs and when clear water is again passed through the pipe line, the taps in the other leg can be varied until pressure difference in both legs is again equalized, the process being repeated until the pressure difference is equal for clear water also for slurry. Again, in achieving equalization, the position of the taps may be radially, as well as linearally, varied.

After the corresponding taps in the two legs have been connected together and to the pressure sensitive device, the upper pairs of taps of FIGS. 1 and 2, or the single tap of FIG. 3, comprising the low pressure taps, are connected to the low pressure side of the pressure differential sensing device and the other two taps are connected to the high pressure side. With the meters 38, 62, calibrated to give a specific gravity of 1 with clear water, the meter will then give a reading greater than 1 acceptably close to the actual specific gravity of the slurry (as determined by tests) that the operator can rely on this reading as an accurate indication of the specific gravity of the slurry passing through the pipe line.

FIG. 6 illustrates the arrangement of FIG. 3 as incorporated in a system which includes in addition to the described specific gravity measuring means, velocity measuring means and means for computing the production rate and the total production of solids.

With reference to FIG. 6, 110 refers generally to a U-bend in a pipeline in which a slurry comprising a mixture of solid and liquid, e.g. dredge spoil, is flowing in the direction of the arrow 112. The U-bend has at its upper end a bend part 114 from which extends a pair of legs 116, 118 connected into the pipeline by respective elbows 20, 22. A single pressure tap 124 is located in the bend 114 and spaced vertically from the tap 124 in each of the respective legs 116, 118 is a tap 126, 128 the positions of all of the taps being selected as described in connection with FIG. 3.

Each of the taps 124, 126, 128 has connected thereto a purge water conduit 130, 132, 134 respectively, each of which is connected through a respective check valve 136, 138, 140 and a flow meter 142 to the output of a differential pressure regulator valve 144 having an input through a check valve 146 from a suitable pressure source of clear water. A control conduit 146 interconnects the conduit 132 to the control cavity of the valve 144 to insure that the flow rate through the purge lines is constant and also at a slightly higher pressure than that in the flow line 110. The use of purge conduits, per se, for the purpose of preventing the back flow of solids into pressure sensing lines is old and forms no part of the present invention, it being sufficient to understand that there is a uniform flow rate through each tap into the flow pipe 110. Should the pressure in the flow pipe momentarily exceed the purge water pressure, solid material cannot enter the purge water conduits 130, 132, 134 because the check valves 136, 138, 140 instantly close creating static columns of water in the purge conduits which positively prevent back flow from the pipeline into the conduits.

As can be seen the purge lines 132, 134 leading to the lower taps 126, 128 have each connected thereto the ends of respective pressure sensing conduits 148, 150 whose opposite ends have a common junction 152 mid-way between the taps connected to the high pressure side of a differential pressure sensing device 154 whose low pressure side is connected by a pressure sensing conduit 156 to the purge line 130 leading to the upper tap 124.

It should be understood that the foregoing purge water system would be applied in the identical manner to the taps and pressure sensing devices of FIGS. 1 through 3.

The conduits 148, 150 being of equal length (though not so shown in the drawings) are averaging conduits producing at the junction 152 and hence in the high pressures side in the device 154 an average of the pressures in the pipeline 110 at the taps 126, 128. Because the pressure at the tap 126 is higher than at the tap 128 purge water in the conduit 132 not only flows into the pipeline 110 through tap 26 but it also flows by way of conduits 148, 150 into conduit 134 adjacent to tap 128 to join the purge water flowing into the pipeline 110 from purge conduit 134. Should there be a momentary surge of pressure in the pipe line 110 at tap 126, solids flow in a reverse direction through the tap is prevented by the instantaneous closing of a normally open solenoid valve 157 responsive to greater-than-purge-line pressure at a tap 26. In addition to the tap 124 there are also connected in the bend 114 a pair of static taps 158, 160 for measuring flow velocity respectively connected to purge lines 162, 164 which are connected to the flow meter 142 through check valves 166, 168. Pressure sensing conduits 170, 172 connect the purge lines 162, 164 to the respective low and high pressure sides of a second pressure sensitive device 174.

As can be seen, the taps 158, 160 lie in a horizontal plane rather than a plane extending radially through the bend 14. The horizontal position of the taps eliminates inaccuracies due to difference in elevation of the taps as occurs when they are arranged radially. A preferred position of the taps into the bend has been determined as a horizontal plane passing through the midpoint of a radial line extending through the pipeline bend at an angle of 22.5° to the horizontal.

The outputs of the differential pressure sensitive devices 154, 174 are preferably electrical and in the milliampere range with signal magnitudes being a direct function of the specific gravity in the case of the differential pressure device 154 and a function of specific gravity and velocity in the case of the device 174. The specific gravity signal is fed from device 154 to a digital display unit 175 calibrated to give direct specific gravity readings varying between 1 and 2 in, say, hundredth increments and this signal is also fed to one input of a multiplier 176.

The signal from the differential pressure sensing device 174 is fed to a corrector 177 which corrects the signal for specific gravity as derived from an input connected to the output of the specific gravity differential pressure sensing device 154. The output signal from the corrector is a direct function of velocity and is fed to a digital display unit 178 calibrated to give direct readings of feet per second, exemplarily ranging up to 35 feet per second in tenth increments. The output from the velocity corrector is also fed to a second input of the multiplier 176.

In addition to the specific gravity and velocity inputs, the multiplier 176 has a third input representing flow constants, especially pipe line diameter, which with the specific gravity signal result in a signal in the multiplier representative of solids concentration. The output of the multiplier is a signal which is a direct function of production rate. This signal is fed to a digital display unit 182 calibrated to give direct readings in tons per hour, exemplarily ranging up to 9,999 tons per hour in unit increments.

The rate signal fed to display unit 182 also is fed to the input of an integrator 184 having a second input representative of time. The output of the integrator is fed to a display unit 186 calibrated to give direct readings in tons ranging up to 99,999 tons in unit increments.

FIG. 2 illustrates a general arrangement of the digital displays on the face of a simple console 188 which may be disposed for ready viewing by the dredge operator. The display units bear the same reference numerals as in FIG. 1 and the quantity figures shown in the displays are representative. The numerals of the displays are desirably of the alpha-numeric electroluminescence type commonly used in calculators.

Though the invention has been described as it would be employed for determining production in dredging operations, the invention is by no means restricted to such use but has applicability in any field where it is desirable to determine the quantity of solids in a solid-liquid mixture moving in a flow pipe.

It will be apparent to those skilled in the art that the invention is susceptible of a variety of changes and modifications without, however, departing from the scope and spirit of the appended claims.

What is claimed is:

1. Means for determining the specific gravity of slurries in motion in a pipeline which includes as a continuous part thereof a pair of legs each having a vertical component and each being connected at one end into the pipeline by an elbow and to each other at their opposite ends by a U-bend and wherein the effects of the elbow and the U-bend on the slurry moving in the pipe line subside in the first leg at distances from said elbow and said U-bend which are unequal from the corresponding distances in the second leg, a pair of vertically spaced pressure taps in each of said legs, each tap of the pair in the first leg being positioned downstream and upstream of the first elbow and the U-bend, respectively, substantially where subsidence of the effects of said elbow and U-bend on the slurry flowing in said first leg first occurs, the first tap in the second leg being positioned downstream of the U-bend substantially where subsidence of the effects of said U-bend on the slurry flowing in said second leg first occurs, the second tap of the second leg being positioned upstream of the second elbow where the effects of the second elbow on the slurry flowing in said second leg have subsided and at a vertical distance from the first tap in the second leg which is not less than the distance between the two taps in the first leg, means for measuring the differential of the average pressure between the upper of the taps and the lower of the taps in the two legs, and means for converting the differential pressure into a signal which is a function of the specific gravity of said slurry.

2. Means for determining specific gravity as in claim 1 wherein the vertical spacing between the pair of taps in the second leg is substantially equal to the spacing between the pair of taps in the first leg.

3. Means for determining specific gravity as in claim 1 wherein the vertical spacing between the pair of taps in the second leg is greater than the spacing between the taps in the first leg by an amount which is proportional to the downstream frictional losses in the pipeline between the first tap in the first leg and the second tap in the second leg.

4. The method of measuring the specific gravity of slurries moving through a pipe line having a U-bend therein including a pair of legs having vertical components comprising the steps of alternately pumping clear water and slurry of known specific gravity through said pipe line, measuring the pressure difference between a pair of vertically spaced positions in each of the respective legs when clear water and when said known slurry is moving in said pipeline, varying said positions, placing pressure taps at those vertically spaced positions of each leg where the pressure difference between said positions in each leg is equal for clear water and also equal for said known slurry, measuring the pressure differential between the average pressure at the upper of said taps and the average pressure at the lower of said taps of both legs when slurry of unknown specific gravity is flowing through the pipe line, and converting said pressure differential into a signal which is a function of the specific gravity of said slurry.

5. The method of claim 4 including, in addition, sensing the velocity of the slurry flow, deriving from said specific gravity reading the solids concentration in said slurry, and deriving the solid flow rate by multiplying the derived concentration by the sensed velocity of flow.

6. The method of claim 5 including deriving total solids flow by integrating the solids flow rate with respect to time.

7. The method of claim 5 wherein said velocity of slurry flow is sensed by deriving a signal which is a direct function of the static pressure difference between two points respectively positioned in a horizontal plane adjacent the inner and outer sides of an arcuate part of said pipe line, and correcting the signal derived from said horizontal points by said signal which is a function of specific gravity to produce a signal which is a function of the velocity of fluid flow.

8. The method of claim 5, including separately visually displaying numerical quantities representing respectively the sensed or derived specific gravity and flow velocity.

9. The method of claim 6 including separately visually displaying numerical quantities representing respectively the sensed or derived specific gravity flow velocity, solids flow rate and total solids.

10. In apparatus for measuring the specific gravity of slurries in motion in a pipeline which includes as a continuous part thereof a pair of legs each having a vertical component, a first pair of elbows connecting the corresponding ends of said legs into the pipe line and a second pair of elbows connecting the opposite ends of said legs to each other, the invention which comprises a pressure tap located at each of a pair of vertically spaced positions in each of said legs where the pressure difference between the two vertically spaced positions of one leg is substantially equal to the pressure difference between the two vertically spaced positions of the other leg when clear water is flowing in the pipe line and also substantially equal when slurry of known specifice gravity is flowing in the pipe line, the taps in the two legs nearer the first pair of elbows being at different vertical positions relative to each other, means for measuring the pressure differential between the average pressure at the upper of said taps and the average pressure at the lower of said taps of both legs when slurry of unknown specific gravity is flowing in the pipeline, and means for converting said pressure differential into a signal which is a direct function of specific gravity.

11. In the apparatus of claim 10 wherein the vertical spacing between the pair of positions in the second leg is substantially equal to the spacing between the pair of positions in the first leg.

12. In the apparatus of claim 11 wherein the vertical spacing between the pair of positions in the second leg is greater than the spacing between the pair of positions in the first leg by an amount which is proportional to the downstream frictional losses in the pipe line between the first position in the first leg and the second position in the second leg.

13. In the apparatus of claim 10 wherein the elbows connecting the legs to each other define a U-bend, one of the upper and lower of said taps being located in the U-bend and comprising a single tap common to both legs, the second tap in the second leg being located in the second elbow of said leg, and the first tap of said first leg being vertically spaced relative to said second tap in said second leg in a position where the pressure between the common tap and said first and said second taps are equal for clear water and for slurry of known specific gravity.

14. In the apparatus of claim 10 means connected to said pipe line for producing a signal which is a direct function of the velocity of flow in the pipe line; and means for deriving from a signal representing flow constants and the signal which is a function of specific gravity a signal which is a function of solids concentration in the flow; and means for multiplying the solids concentration and velocity signals to produce a signal which is a direct function of the rate of solids flow in the slurry.

15. In the apparatus of claim 14 including means for integrating the last mentioned signal relative to time to produce a signal which is a function of the total production of solids in said flow.

16. The apparatus of claim 14 wherein the velocity signal producing means comprises a pair of static pressure taps positioned in a horizontal plane adjacent the inner and outer sides of an arcuate part of said U-bend; static presssure sensing means connecting the taps on the inner and outer sides of said arcuate part to the respective low and high pressure sides of a second differential pressure sensing device;

means for sensing the output signal of said second differential pressure sensing device; and means for correcting said signal including means responsive to the signal which is a function of specific gravity for producing a signal which is a function of flow velocity.

17. The apparatus of claim 14 including means for separately displaying numerical representations of specific gravity and slurry velocity.

18. The apparatus of claim 15 including a console, and separate visual display means on said console for displaying separately numerical representations of specific gravity, slurry velocity, flow rate of solids, and total solids flow.

* * * * *